Nov. 24, 1959

L. R. CROW, JR., ET AL 2,914,592

PREVENTION OF ACID CARRY-OVER AND REBOILER
FOULING IN CASCADE SULFURIC
ACID ALKYLATION SYSTEM

Filed Nov. 20, 1957

INVENTORS:
Lloyd R. Crow, Jr.
Leonard A. Hays
Oral A. Kozeny

BY Donald E. Payne

ATTORNEY

United States Patent Office 2,914,592
Patented Nov. 24, 1959

2,914,592
PREVENTION OF ACID CARRY-OVER AND REBOILER FOULING IN CASCADE SULFURIC ACID ALKYLATION SYSTEM

Lloyd R. Crow, Jr., Leonard A. Hays, and Oral A. Kozeny, Neodesha, Kans., assignors to Standard Oil Company, Chicago, Ill., a corporation of Indiana Application November 20, 1957, Serial No. 697,563

3 Claims. (Cl. 260—683.62)

This invention relates to a cascade sulfuric acid system for alkylating isobutane with olefins having 3 to 5 carbon atoms per molecule wherein the formation of heavy alkylate requires fractionation of the alkylate product and it pertains more particularly to the inhibiting of acid and uncompleted reaction products carry-over with product alkylate. This results in higher aviation alkylate yield and less deposit formation on reboiler heating surfaces employed in the fractionation step.

When isobutane is alkylated with $C_3$–$C_5$ olefins such as a butylene mixture in a so-called "casade" type of alkylation unit (note U.S. 2,429,205), a certain amount of heavy alkylate is usually formed so that a rerunning or fractionation step is required. In such operations the reboiler tubes in the rerun or fractionator tower become heavily coated with deposits after an operation of only about two weeks unless steps are taken to avoid such deposit formation. Copending application 558,968, now Patent No. 2,818,458, described a method of inhibiting deposit formation in such reboiler tubes but that method required considerable added investment and operating cost. The object of this invention is to accomplish the same result without the added investment and operating cost and also to avoid acid carry-over which has been encountered from time to time in units of this type. Plant operation has demonstrated that higher aviation alkylate yields also result from this invention.

In accordance with our invention the settling zone in the cascade sulfuric acid system is divided into a small initial presettling zone and a succeeding large settling zone by the simple addition of a specially designed baffle which is sufficiently close to the mixing zones so that the liquid holding time in the initial or presettling zone is less than about 10 minutes and is usually in the range of about 3 to 10 minutes while the liquid holding time in the succeeding settling zone is greater than 20 minutes and may be as much as an hour or two. By separating initial acid with its contained intermediate products from the alkylation zone effluent in the described presettler and immediately recycling this initial acid to the first reactor or to the incoming isobutane stream, the formation of undesirable by-products is minimized and most, e.g. up to about 90 percent, of the acid may be recycled for reuse. The acid which is more tightly bound to the alkylate phase and which thus separates therefrom more slowly is withdrawn as spent acid from the large downstream portion of the settling zone. By presettling and prompt recycle of the initial acid, desired types of emulsions are maintained in the alkylation zones and also in the downstream settling zone. Use of this simple presettling and recycling expedient has substantially eliminated the acid carry-over and reboiler fouling problems and increased aviation alkylate yield.

In the mixing or alkylation zones it is preferred that a stable or tight hydrocarbon-acid emulsion be employed or, in other words, that phase separation be substantially avoided; this is facilitated by employing about 50 to 60 percent acid in the emulsion and is thus helped by recycling large amounts of acid. The type and extent of mixing must also be carefully controlled in the alkylation zones. In order that the tight or stable emulsion may be quickly broken before it enters the presettling zone, we preferably employ an emulsion modifying step which may, for example, consists of passing said emulsion through a coalescing zone. Thus a loose or unstable emulsion may be present in the settling zones while a tight, stable emulsion is maintained in the alkylation zones.

The invention will be more clearly understood from the following description of a specific example thereof read in conjunction with the accompanying drawing which is a schematic flow diagram of our improved cascade type alkylation unit.

For alkylating about 1500 barrels per day of olefins from a butane-butylene stream, we may employ a horizontal, cylindrical vessel 10 about 40 feet in length and 10 feet in diameter. Isobutane may be introduced at the inlet end of the vessel through line 11 to a preflash zone and the isobutane may flow over baffle 12 into the first mixing or alkylation zone. Emulsion from this first mixing or alkylation zone flows over baffle 13 to the second alkylation zone, then over baffle 14 to the third alkylation zone and finally over baffle 15 under baffle 16 and over baffle 17 to the settling section of the vessel which is to the right of baffle 17. In this example the preflash zone may be about 2 feet, each alkylation zone about 7½ feet and the coalescing zone about 2½ feet in length.

In accordance with our invention an additional baffle 18 is installed in the settling zone about 3 feet from baffle 17, the top of baffle 18 preferably being about .2 to 2 feet, e.g. about 1 foot, below the top of baffle 17. The newly added baffle 18 segregates the settling space into an initial or presettling zone wherein most of the acid can be promptly removed from the remaining alkylate effluent stream in a period of time of about 3 to 10, e.g. about 5, minutes. The upper part of the baffle is perforated to aid in coalescing the residual acid while flowing into the large settling zone. About 8 to 14 feet from baffle 18 there is the final baffle 19 over which substantially acid-free alkylate is passed, the space between baffles 18 and 19 providing a sufficiently long settling time for removal of all remaining acid from the alkylate.

Referring to the alkylation portion of the vessel, isobutane flows over baffle 12 at the rate of about 6,000 barrels per day, sulfuric acid of about 90–98 percent concentration is introduced through line 20 at a rate to give about 50 to 60 volume percent acid in the emulsion, and olefin charge is introduced through line 21 at the rate of about 500 barrels per day, the liquids being intimately contacted and maintained in the state of a tight emulsion by impeller-mixer 22 which is driven by motor 23. The alkylation is preferably effected at a temperature of about 35° F. under pressure of about 2 to 15 p.s.i.g., the external isobutane to olefin ratio being in the range of about 5:1 to 9:1 and the internal isobutane to olefin ratio being in the range of about 200:1 to 600:1. The olefin space velocity is in the range of about .15 to .4 or about .25 volume of introduced olefin per hour per volume of acid.

The emulsion which flows over baffle 13 to the second alkylation stage may pass over the top of the baffle or through an opening at one side of the baffle or through any suitable conduit or passageway. Since no novelty is claimed in the flow control techniques employed in the alkylation portion of the system, these techniques are diagrammatically illustrated and do not require detailed description. In this example another 500 barrels per day of olefins are introduced through line 24 wherein a tight emulsion is maintained by impeller-mixer 25 driven by motor 26. In the third alkylation stage the remaining 500 barrels per day of olefin charge is introduced and intimately contacted with the emulsion by impeller-mixer 28 which is driven by motor 29.

The alkylation effluent which flows over baffle 15 is in the form of a tight or stable emulsion and it is transformed into an unstable or loose emulsion during its passage under baffle 16 between baffles 15 and 17. In this example the space between baffles 15 and 17 is filled with a packing material 30 such as Raschig rings although it should be understood that other high surface area coalescer materials may be used in place thereof. The effluent leaving the coalescing zone and flowing over baffle 17 is a less stable emulsion than the material which entered the coalescer and most, e.g. up to 90 percent, of the acid separates from the remaining alkylate in the presettling zone between baffles 17 and 18. This initial acid is immediately and rapidly returned by pump 32 and line 31 together with any required makeup acid through line 33 to the initial reactor or by line 34 to line 11 through which recycled isobutane is introduced and into which makeup isobutane is added through line 35. The initial acid (which is thus so promptly recycled and has substantially no opportunity to remain in contact with alkylate product) is believed to contain partially converted and/or by-product materials which would cause reboiler fouling if permitted to remain in contact with alkylate product but which actually improves product yield and quality when immediately separated and recycled in the manner described.

The acid which is more tightly held by the alkylation effluent is separated therefrom in the space between baffles 18 and 19. This acid is withdrawn through line 36 and recycled, reworked, or discarded. The acid-free alkylate which flows over baffle 19 is withdrawn through line 37 by a pump, scrubbed with caustic and then water-washed in system 38, and then introduced into deisobutanizer 39 which is provided with a conventional reboiler 40. Overhead from tower 39 is condensed in cooler 41 and sent to receiver 42 from which condensate isobutane is removed by pump 43, a part of this isobutane being returned by line 44 as reflux and the remainder being recycled by line 45 and line 11.

Liquid from the base of deisobutanizer 39 is introduced by line 46 to debutanizer 47 which is provided with a conventional reboiler 48. Butane overhead is condensed in cooler 49 and sent to receiver 50, a part of the condensate removed by pump 51 being returned by line 52 for reflux and the remainder withdrawn through line 53 as normal butane product.

Liquid leaving the base of tower 47 through line 54 is introduced to fractionation tower 55 which is provided with a conventional reboiler 56; this is the reboiler which has presented the fouling problem but in this example the reboiler has been operated for more than six months without undue fouling. Overhead from fractionator 55 is condensed in cooler 57 and sent to receiver 58, a part of the condensate withdrawn by pump 59 being returned by line 60 for reflux and the remainder withdrawn through line 61 as aviation alkylate. Heavy alkylate is withdrawn through line 62.

The optimum alkylation temperature may be maintained in any desired manner and in this example it is maintained by withdrawing isobutane vapors through line 63, compressing them in compressor 64, condensing them in cooler 65 and then returning them via receiver 66 and line 67 to line 11, any lighter hydrocarbons being vented from receiver 66 by line 68.

While the invention has been described in considerable detail with respect to a specific example thereof, it should be understood that alternative arrangements and operating conditions will be apparent from the above description to those skilled in the art. Thus, glass wool or other fibrous material may be employed instead of Raschig rings in the coalescing zone and/or the emulsion may be diluted with isobutane or alkylate or treated by other known means which does not degrade the acid or alkylate between the mixing and the settling zones in order to change the emulsion from a tight or stable form to a less stable or quick-breaking emulsion. While a caustic wash system has been diagrammatically illustrated between the settling zone and the deisobutanizer, such a caustic wash is not always essential, particularly if the alkylate is passed through an adsorption zone and/or otherwise contacted with clay for obtaining neutralization and the removal of undesirable impurities.

We claim:

1. In a cascade sulfuric acid system comprising an alkylation zone for alkylating isobutane with a $C_3$ to $C_5$ olefin and a settling zone for separating acid from alkylate, the method of operation which comprises separating initial acid with its contained intermediate products from the alkylation zone effluent in an initial, segregated, small portion of the settling zone with a liquid holding time less than about 10 minutes, recycling the initial acid immediately to a zone containing a high isobutane concentration, settling and withdrawing the remaining acid from alkylate in a succeeding large segregated portion of the settling zone with a liquid holding time greater than 20 minutes and separately withdrawing substantially acid-free alkylate.

2. The method of claim 1 which includes the step of treating the emulsion between the alkylation zone and the settling zone to decrease the stability of said emulsion and to enable rapid separation of initial acid therefrom.

3. The method of claim 2 wherein the treating step between the alkylation and settling zones is effected by contacting the alkylation zone effluent with coalescing material.

References Cited in the file of this patent

UNITED STATES PATENTS

| | | |
|---|---|---|
| 2,245,038 | Holm et al. | June 10, 1941 |
| 2,346,770 | Lobdell et al. | Apr. 18, 1944 |
| 2,393,154 | Franklin | Jan. 15, 1946 |
| 2,419,692 | Shoemaker et al. | Apr. 29, 1947 |

FOREIGN PATENTS

| | | |
|---|---|---|
| 535,664 | Great Britain | Apr. 17, 1941 |
| 763,314 | Great Britain | Dec. 12, 1956 |